(12) United States Patent
Costa

(10) Patent No.: US 6,314,675 B1
(45) Date of Patent: *Nov. 13, 2001

(54) AIR CULTURE SYSTEM COMPRISING A MANAGEMENT SYSTEM

(76) Inventor: Giancarlo Costa, Via Padova, 43, 30027 San Dona'Di Piave, Venice (IT)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,155
(22) PCT Filed: Jan. 30, 1997
(86) PCT No.: PCT/EP97/00407
 § 371 Date: Aug. 6, 1998
 § 102(e) Date: Aug. 6, 1998
(87) PCT Pub. No.: WO97/30580
 PCT Pub. Date: Aug. 28, 1997

(30) Foreign Application Priority Data

Feb. 21, 1997 (IT) .............................. MI96A0323

(51) Int. Cl.⁷ .................................................. A01G 31/06
(52) U.S. Cl. ................................. 47/62 A; 47/59; 47/17
(58) Field of Search .......................... 47/62 R, 62 A, 47/62 C, 62 E, 62 N, 17, 18, 59, 60, 1.01 F

(56) References Cited

U.S. PATENT DOCUMENTS

| | | | |
|---|---|---|---|
| 4,216,617 | * 8/1980 | Schmidt | 47/62 |
| 4,290,242 | * 9/1981 | Gregory, Jr. | 52/2 |
| 4,869,019 | * 9/1989 | Ehrlich | 47/62 |
| 4,937,969 | * 7/1990 | Kawabe et al. | 47/17 |
| 4,965,962 | * 10/1990 | Akagi | 47/65 |

(List continued on next page.)

FOREIGN PATENT DOCUMENTS

| | | | |
|---|---|---|---|
| 3602035 | * 8/1986 | (DE) | 47/62 C |
| 275712 | * 12/1986 | (EP) | 47/62 R |
| 2101863 | * 1/1983 | (GB) | 47/62 C |
| 405176641A | * 7/1993 | (JP) | 47/62 |
| 406303866A | * 11/1994 | (JP) | 47/62 A |

(List continued on next page.)

OTHER PUBLICATIONS

"The use of Insoluble Salts in Balanced Solutions for seed plants", Annals of the Missouri Botanical Garden, vol. 7, Duggar, Jul. 1920.*

(List continued on next page.)

Primary Examiner—Darren W. Ark
(74) Attorney, Agent, or Firm—Hedman & Costigan, P.C.

(57) ABSTRACT

The air culture system (realized on fixed or movable trays (4) disposed inside one or more greenhouses (1)) comprises a management system comprising a central unit (3) and one or more peripheral logic units: at least one peripheral unit (2) is disposed inside each greenhouse (1).

The central unit (3) allows to control and to manage the working of the system, by modifying the reference values of the parameters (greenhouse temperature, physical and chemical characteristics of the nutritive solution, etc) controlled by each peripheral unit (2) to grow the plants disposed on the trays (4) inside the greenhouse (1) managed by the peripheral unit (2), under conditions which should be as similar as possible to the ideal ones.

Moreover, the central unit (3) gathers and processes for informative and statistic purposes the values of the above-mentioned parameters detected (and, if it's the case, previously processed) by the peripheral units (2).

Moreover, a particularly advantageous formulation of the nutritive solution is disclosed. (FIG. 1)

39 Claims, 5 Drawing Sheets

U.S. PATENT DOCUMENTS

| | | | |
|---|---|---|---|
| 4,982,527 | * | 1/1991 | Sprung .................................. 47/59 |
| 5,009,029 | * | 4/1991 | Wittlin .................................. 47/62 |
| 5,031,358 | * | 7/1991 | Sussman ............................... 47/58 |
| 5,042,196 | * | 8/1991 | Lukawaski ............................ 47/65 |
| 5,097,627 | * | 3/1992 | Roberts ................................. 47/65 |
| 5,101,593 | * | 4/1992 | Bhatt ..................................... 47/17 |
| 5,184,420 | * | 2/1993 | Papadopoulos et al. ............. 47/62 |
| 5,212,906 | * | 5/1993 | Okuno et al. ......................... 47/62 |
| 5,285,595 | * | 2/1994 | Shirato .................................. 47/62 |
| 5,394,647 | * | 3/1995 | Blackford, Jr. ....................... 47/62 |
| 5,558,984 | * | 9/1996 | Young et al. ......................... 435/3 |
| 5,590,490 | * | 1/1997 | Kikuchi ................................. 47/59 |
| 5,598,663 | * | 2/1997 | Kikuchi ................................. 47/62 |
| 5,771,634 | * | 6/1998 | Fudger .................................. 47/62 |
| 5,813,168 | * | 9/1998 | Clendening ........................... 47/17 |

FOREIGN PATENT DOCUMENTS

| | | | |
|---|---|---|---|
| J6 2259514 | * | 11/1987 | (JP) .................................. 47/62 N |
| J6 3182284 | * | 7/1988 | (JP) .................................. 47/62 N |
| J02231020 | * | 9/1990 | (JP) .................................. 47/62 N |
| 404135427 A | * | 5/1992 | (JP) .................................. 47/62 N |
| 404141031A | * | 5/1992 | (JP) .................................. 47/62 N |
| 405076251A | * | 3/1993 | (JP) .................................. 47/62 N |
| 002000048C | * | 9/1993 | (RU) ................................. 47/62 N |
| WO 90/08460 | * | 8/1990 | (WO) ................................ 47/62 N |
| WO 95/08260 | * | 3/1995 | (WO) ................................ 47/62 R |

OTHER PUBLICATIONS

"Studies on the relation of Aeration and continuous Renewal of Nutrient solution to the growth of soybeans in Artificial culture", American Journal of Botany, vol. 10, Allison et al., Jan. 1923.*

"Relation of the Concentration and reaction of the Nutrient Medium to the Growth and Absorption of the plant", Journal of Agricultural Research, vol. 18, Hoagland et al., Oct. 1919.*

"The ABC of NFT", Grower Books, pp. 46–97, Jan.. 1997.*

"Influence of Wheat Seedlings upon the Hydrogen Ion Concentration of Nutrient Solutions", Botanical Gazette, vol. 73, Jones et al., May 1922.*

"Relation of Nutrient Salt Concentration to Growth of the Tomato and to the Incidence of Blossom Rot of the Fruit", Plant Physiology, vol. 12, Robbins, Jan. 1937.*

"Influence of the pH of a culture solution on the rates of Absorption of Ammonium and Nitrate Nitrogen by the tomato plant", Soil Science, vol. 37, Clark et al., Jun. 1933.*

"Nutrition of Plants considered as an Electrical Phenomenon", Soil Science, vol. 71, Breazeale et al., May 1951.*

* cited by examiner

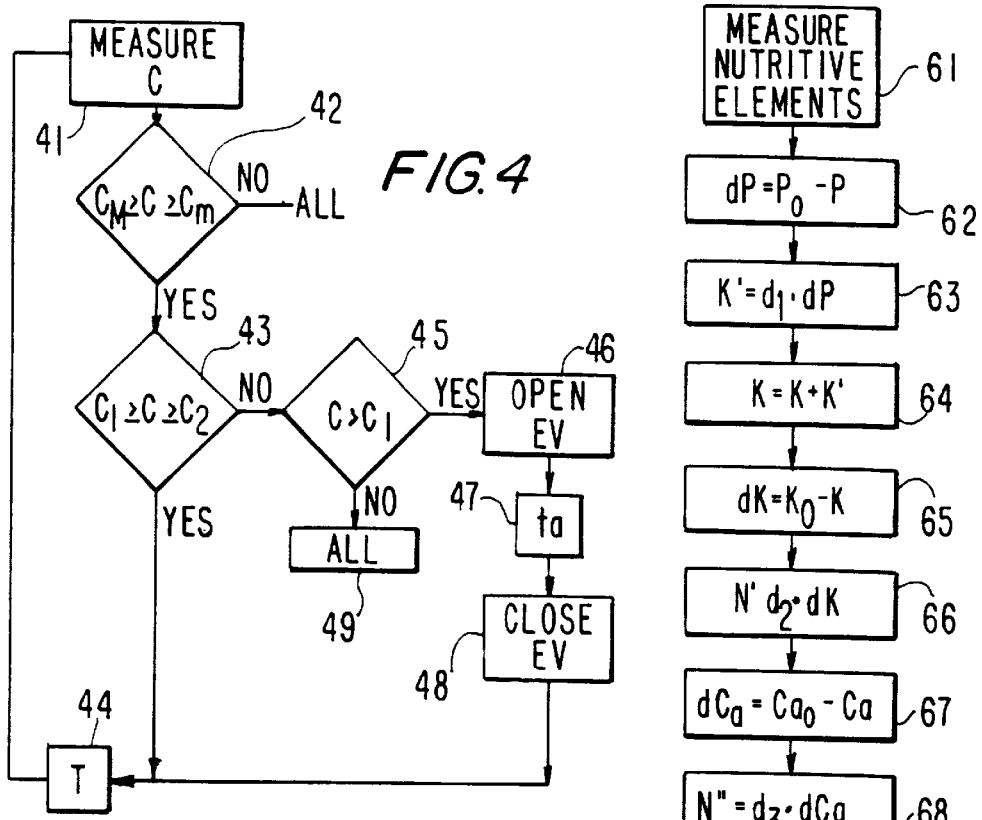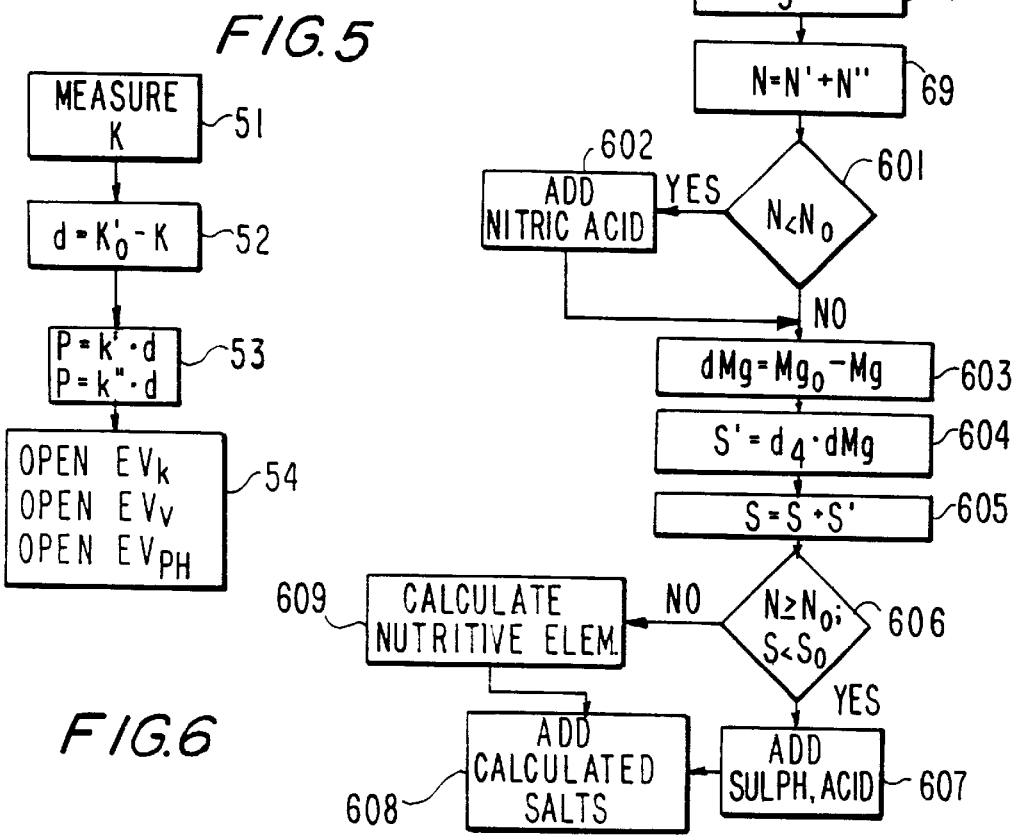

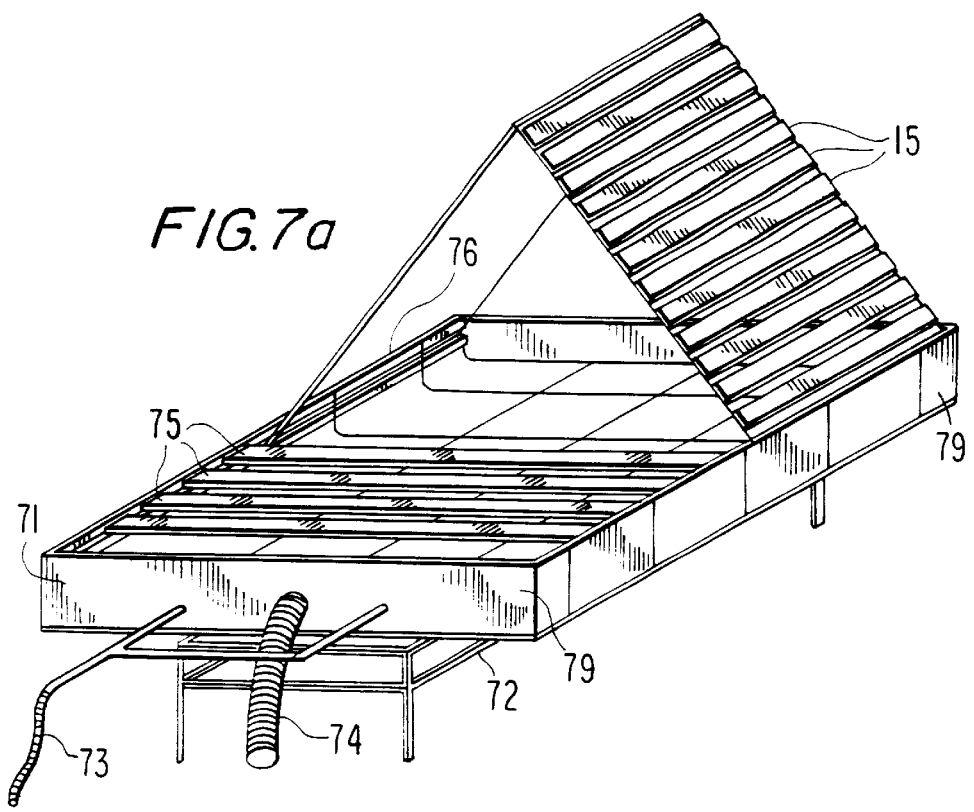
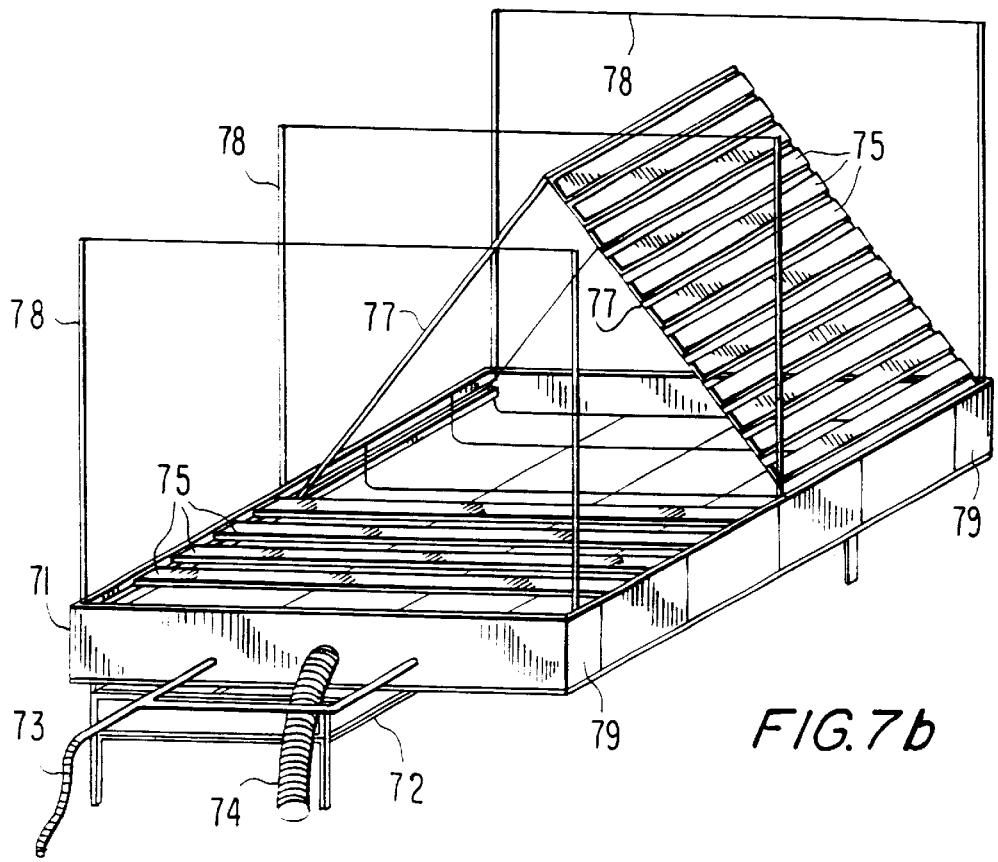

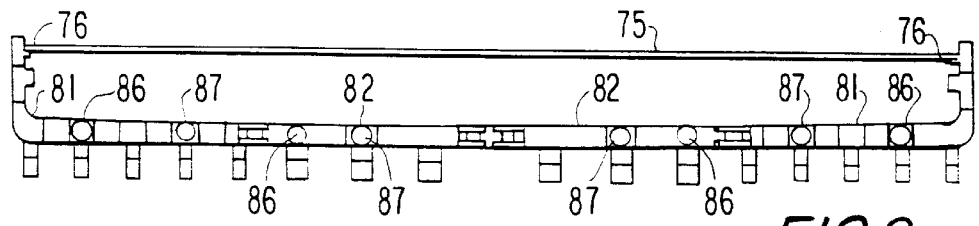
FIG.8a
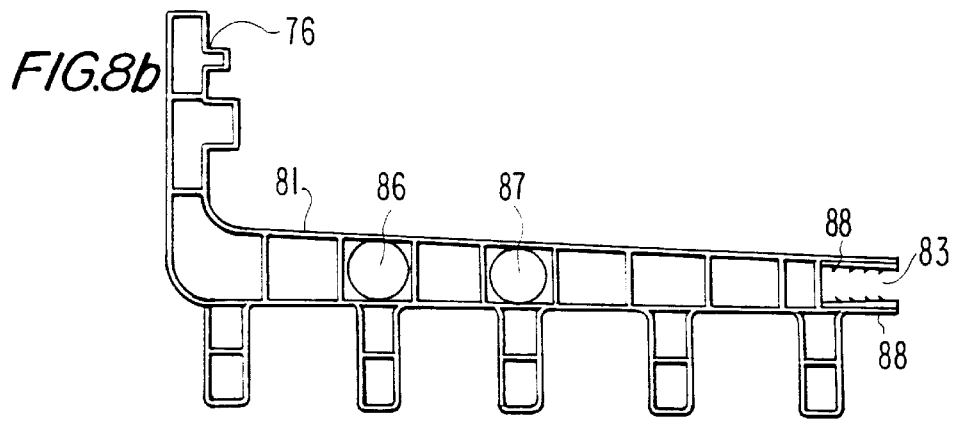
FIG.8b
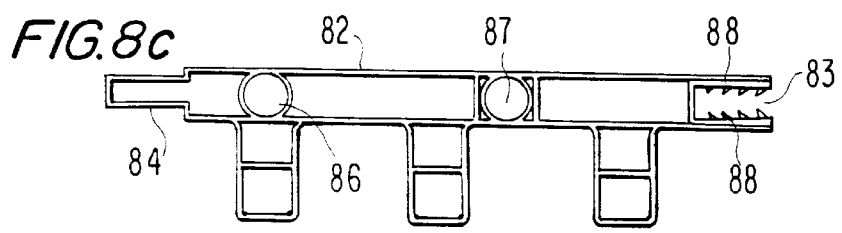
FIG.8c
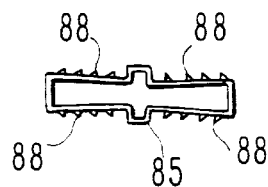
FIG.8d
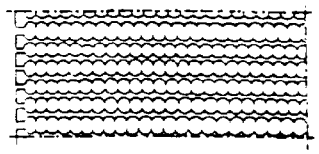 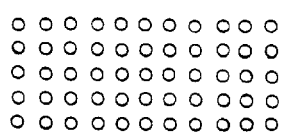 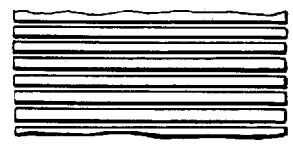
FIG.8e

US 6,314,675 B1

AIR CULTURE SYSTEM COMPRISING A MANAGEMENT SYSTEM

FIELD OF THE INVENTION

The present invention relates to an air culture system on fixed or movable trays, having a management system (comprising a central logic unit and one or more peripheral logic units disposed in the greenhouses used for the air culture) which allows to grow plants to be cultivated (such as, for example, flowers, vegetables, ornamental plants and/or half standard fruit trees; hereinafter referred to as "plants") in conditions which should be as similar as possible to the ideal ones. Each greenhouse is managed by at least one peripheral logic unit which controls and adjusts a plurality of parameters (temperature inside the greenhouse, physical and chemical characteristics of the nutritive solution, etc.), keeping them as near as possible to the reference values recorded in the peripheral logic unit, values which correspond to the best vegetative conditions for the plants disposed on trays inside the greenhouse governed by the peripheral logic unit.

The central unit allows an operator to control and manage the working of the management system, by modifying the reference values recorded in each peripheral logic unit: moreover, the central unit gathers and processes for informative and statistic purposes the values of the above-mentioned parameters detected (and, if it's the case, previously processed) by the peripheral logic units.

PRIOR ART

An air culture system comprises a plurality of trays (which can be fixed or movable) disposed inside one or more greenhouses: plants are held and sustained by support means which are parts of the trays so that their roots, jutting out of the support means, are free "in the air" inside the tray; to supply plants with water and nutritive elements necessary to their growth, roots are sprinkled with a nutritive solution coming from one or more containers, such solution being periodically sprinkled in the area of the tray underneath the support means of the plants, by means of pipes having nozzles (or other similar means) disposed on the bottom of the tray.

Known air culture systems often present high overheads and operating costs which are (or might be) due to the fact that the prototype state has not (very often) been overcome and/or to the fact that complicated and expensive engineering solutions have been used, unjustified by the possible gains obtained.

U.S. Pat. No. 4,965,962 (D1) discloses an hydroponic culture system positioned inside a greenhouse and comprising a management system, a plurality of sets of angled panels (supporting the grown plants) movable along the floor of the greenhouse and hydroponic solution spraying means, where the management system comprises a control unit which is able to control and adjust at a given value the $CO_2$ concentration.

WO-A-95 08260 (D2) discloses an hydroponic control apparatus managed by a logic unit which controls at least one peripheral device, positioned inside a greenhouse, which includes sensors for controlling a plurality of parameters and means for power supply control switches: the peripheral devices do not include a logic unit and the signals emitted by the sensors belonging to a peripheral device are directly sent to the logic unit which, in response to the received signals, operates the control switches belonging to the same peripheral device. U.S. Pat. No. 4,869,019 (D3) discloses a self-contained tray for aeroponics including a tank, a closed structure and individual means for circulating a nutritive solution inside the closed structure, said closed structures in turn comprising a front panel (sustaining the plants grown on the tray), side panels and a back panel: the lower edges of the closed structure are secured by screws in watertight and light-tight manner in rabbets positioned at upper ends of the tank. The present invention relates to an air culture system, which can be made on an industrial scale, comprising modular trays and a management system which makes it possible to use the system to grow plants in the best manner under any environmental condition, by avoiding and/or eliminating the above-mentioned limits and/or defects concerning the known air culture systems; such a management system allows to obtain particularly advantageous results if the nutritive solution, which has a novel and original formulation and is disclosed herein, is used.

SUMMARY OF THE INVENTION

The present invention relates to an air culture system (made of a plurality of trays disposed inside one or more greenhouses) comprising a management system comprising a central logic unit and at least one peripheral logic unit, disposed inside a greenhouse, which manages the greenhouse by controlling and adjusting at given values a plurality of parameters (modifiable by the central unit) to obtain the best vegetative conditions for the plants grown inside the greenhouse. Moreover, the central unit gathers and processes for informative and statistic purposes the values of the above-mentioned parameters, detected from the peripheral logic units.

The parameters controlled and adjusted at given values by a peripheral logic unit comprise the period and the duration of plant sprinkling with a nutritive solution, the pH value and the conductivity of the nutritive solution and the concentration of the nutritive elements in the nutritive solution.

LIST OF THE DRAWINGS

The present invention will be clarified, now, by referring to a not limiting example of embodiment, wherein FIG. 1 shows schematically an air culture system comprising a management system according to the present invention;

FIG. 4 shows a simplified flowchart showing the cyclic sequence of functional steps performed by the peripheral logic unit 2 of FIG. 1 to control and adjust at a given value the conductivity of the nutritive solution;

FIG. 5 shows a simplified flowchart showing the sequence of functional steps performed by the peripheral logic unit 2 of FIG. 1 to control and adjust at given values the concentration of the nutritive elements in the nutritive solution;

FIG. 6 shows a simplified flowchart showing a further sequence of functional steps performed by the peripheral logic unit 2 of FIG. 1 to control and adjust at given values the concentration of the nutritive elements in the nutritive solution;

FIG. 7 shows schematically a sectional and modular tray;

FIG. 8 shows schematically the elements which form the tray of FIG. 7.

In Figures which are enclosed herein, the corresponding elements will be identified by means of the same alphanumeric reference.

DETAILED DESCRIPTION

Figure 1:
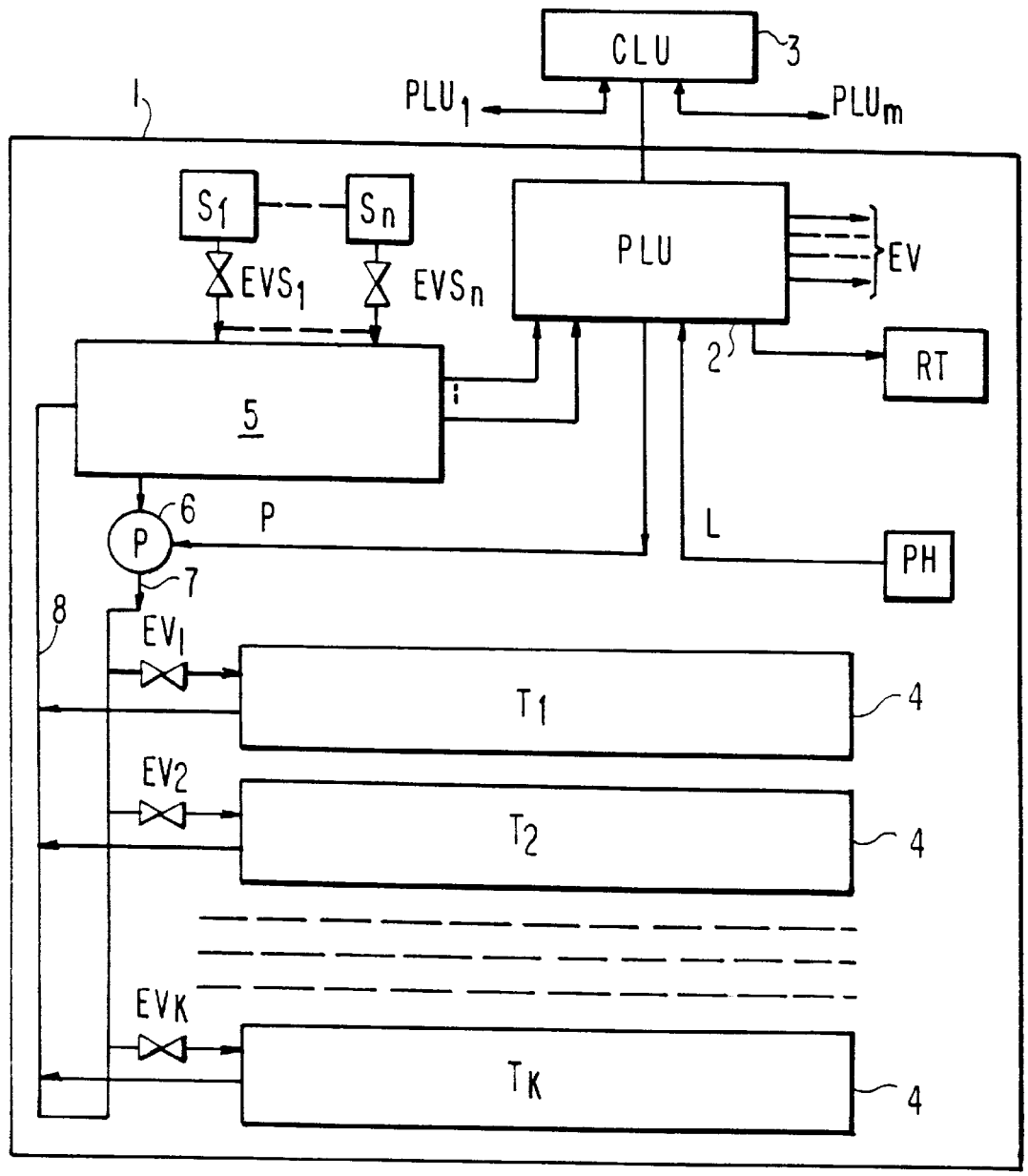

FIG. 1 shows schematically an air culture system made of a plurality of trays disposed inside one or more greenhouses and comprising a management system which comprises a central logic unit and one or more peripheral logic units disposed inside the greenhouse(s).

The central logic unit is preferably disposed outside the greenhouse(s) 1, but, without going beyond the scope of the present invention, it might be disposed inside a greenhouse, provided that it is correctly protected from the environmental conditions inside the greenhouse.

The present embodiment shows a greenhouse 1 managed by a peripheral logic unit (PER) 2, but, without going beyond the scope of the present invention, it is possible to install two or more peripheral logic units 2 inside a greenhouse, one of which controls the environment inside the greenhouse and trays 4 or other peripheral logic units control only trays 4 or some of trays 4.

FIG. 1 shows the greenhouse 1; the peripheral logic unit 2 which manages the greenhouse 1; the central unit (PC) 3 disposed outside the greenhouse 1 and able to "dialogue" with all the peripheral logic units ($PER_1$–$PER_m$) disposed inside the greenhouses 1 which constitute the air culture system; a plurality of trays 4 ($B_1$–$B_k$); a tank 5 containing the nutritive solution; a pump (P) 6 which makes it possible for the nutritive solution to circulate inside the circuit which comprises the feed pipe 7 and the runback 8; a plurality of tanks S ($S_1$–$S_n$) containing water and other chemical compounds (or blends thereof), as it will be clarified hereinafter; sensors which detect the parameters (temperature and luminosity inside the greenhouse, chemical and physical characteristics of the nutritive solution, etc.) which are adjusted by the peripheral logic unit 2 and actuators controlled by the peripheral unit 2 to adjust the above-mentioned parameters.

Sensors comprise at least some sensors associated with the tank 5 (not shown in figure and known) which measure pH, conductivity, temperature of the nutritive solution and concentration of the nutritive elements in the nutritive solution, a photometer FO which measures the luminosity L inside the greenhouse 1, one or more thermometers (not shown in figure) which measure the temperature of different zones inside and outside the greenhouse 1.

In reply to the values measured by the sensors, the peripheral logic unit 2 activates means RT("RT", when used herein and in the drawings indicates apparatuses known in the art for controlling environmental data) to keep at the best values (in a known manner) the moisture and the temperature inside the greenhouse 1 and the temperature of the nutritive solution, controls (as shown for example in the flowchart of FIG. 2) the pump 6 and the electrovalves EV ($EV_1$–$EV_k$) which connect the trays 4 to the feed pipe 7 to control the frequency and the duration of the plants sprinkling with the nutritive solution and drives (as shown for example in the flowcharts of FIGS. 3–6) the electrovalves EVS ($EVS_1$–$EVS_n$) which connect the tanks S to the tank 5 to adjust and/or to keep at the best values the pH value and the conductivity of the nutritive solution and the concentration of the nutritive elements in the nutritive solution.

The peripheral logic unit 2 also transmits the values detected from the sensors and the control signals transmitted to the actuators (means RT, pump 6, electrovalves EV and EVS) to the central unit 3: the central unit 3 gathers and processes for informative and statistic purposes the informations given by the peripheral units 2.

Without going beyond the scope of the present invention, it is possible to substitute the electrovalves ($EV_1$–$EV_k$; $EVS_1$–$EVS_n$) with other functionally similar means.

If the peripheral unit 2 detects motor troubles of the devices (pumps, electrovalves, ecc.) and/or if the values measured by the sensors do not belong to given value ranges, the peripheral logic unit 2 transmits alarm messages to the central unit 3 and/or activates optic and/or acoustic alarm systems.

To reduce overhead, it is possible to provide for the intervention of the staff only when it is really necessary by providing for the transmission of different messages according to the risk (at least the potential risk) that each abnormal above-mentioned condition detected by the peripheral unit 2 involves (or might involve) the air culture: for example, it can be considered sufficient that the peripheral logic unit 2 informs the central logic unit 3 (without activating the alarm systems) that one or more values measured by the sensors "go out" of the correspondent range of values given in a desultory manner, while it is necessary that the peripheral logic unit 2 activates the alarm systems to ask an immediate intervention if it detects a device trouble and/or if one or more values detected by the sensors "go out" of the correspondent range of values for a given time.

In FIG. 1 the signal from the peripheral logic unit 2 which controls the pump 6 is indicated by P and, globally, the signals from the peripheral logic unit 2 which control the electrovalves ($EV_1$–$EV_k$; $EVS_1$–$EVS_n$) are indicated by EV.

Long and exhaustive experimental studies allowed to obtain a novel and original formulation of the nutritive solution which can be used for all grown plants, by modifying the concentration of the nutritive elements in the nutritive solution from time to time; the same nutritive solution can be used to grow a plurality of plants.

Such a nutritive solution is prepared starting from the water available "locally", in which given amounts of nutritive elements in form of salts (potassium nitrate; calcium nitrate or aragonite; monohydrogen or dihydrogen potassium phosphate or potassium tetrapyrophosphate; magnesium sulphate) and very small, given amounts of "microelements" (such as iron, copper, silicon, spelter, molybdenum, boron and manganese) which are absorbed by the root system of plants, are dissolved: when determining the amounts of the "microelements" and of the salts of the nutritive elements to be dissolved in water, the presence of the above chemical elements dissolved in the water must be taken into consideration.

To prepare a nutritive solution into 1000 liters of water are dissolved 500–3000 g of potassium nitrate, 700–4000 g of calcium nitrate or aragonite, 200–1500 g of monohydrogen potassium phosphate or 150–1350 g of dihydrogen potassium phosphate or 50–1050 g of tetrapyrophosphate potassium and 300–1800 g of magnesium sulphate.

The concentration of the "microelements" in the nutritive solution changes during the culture and it can be adjusted by the addition, if and when it is necessary, of small amounts of a concentrated solution of the "microelements" or of the single deficient salts to the nutritive solution; the conductivity of the nutritive solution and the concentration of the nutritive elements in the nutritive solution (elements which are absorbed in a different rate by the root system of the plants) are controlled and adjusted at the given values by the peripheral unit 2, as it will be illustrated referring to FIGS. 4, 5 and 6.

Figure 3:
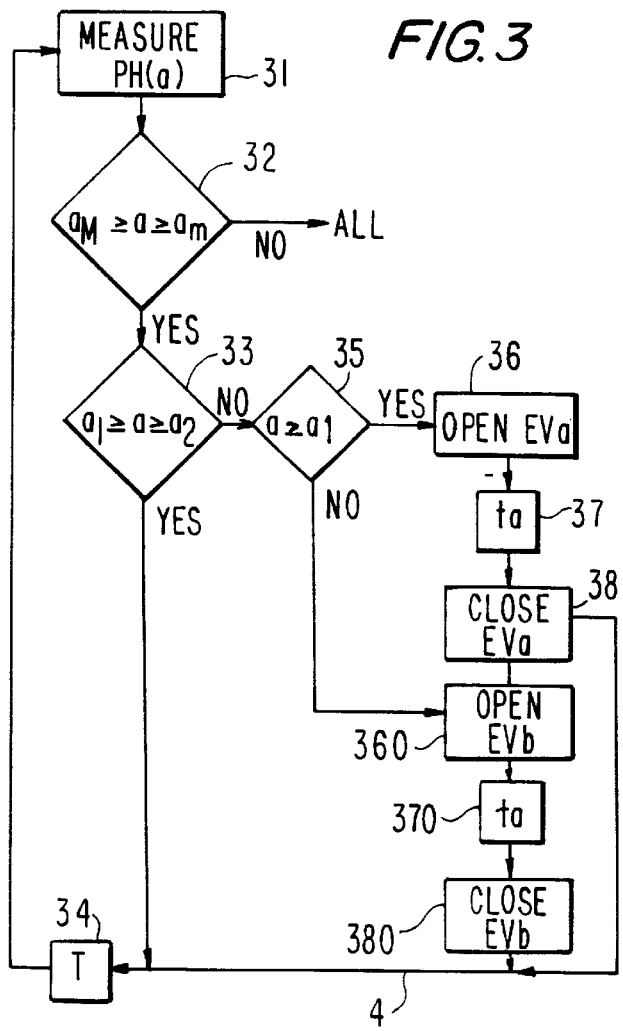
FIG. 3 shows a simplified flowchart showing the cyclic sequence of functional steps performed by the peripheral logic unit 2 of FIG. 1 to control and adjust at a given value the pH value of the nutritive solution.

The tank 5 is filled to the brim, if necessary, by the addition of the necessary amount of nutritive solution prepared by dissolving in water given amounts of nutritive elements in form of salts; alternatively, it is possible to fill the tank 5 to the brim with water and adjust at the given values the concentration of the nutritive elements in the nutritive solution and the pH value of the nutritive solution, as it will be illustrated referring to FIGS. 3, 5 and 6.

Figure 2:
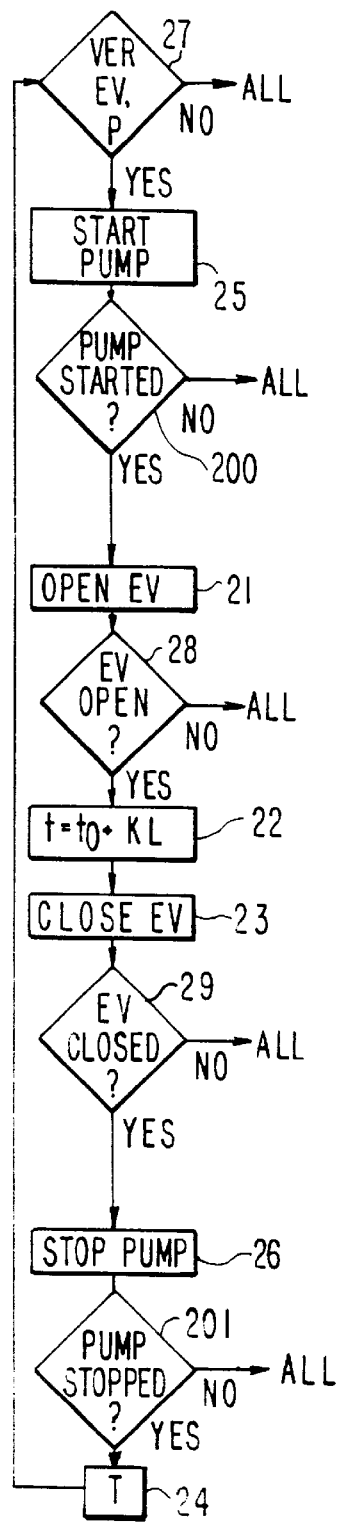
FIG. 2 shows a simplified flowchart showing the cyclic sequence of functional steps performed by the peripheral logic unit 2 of FIG. 1 to control and adjust at given values the frequency and the duration of plant sprinkling with the nutritive solution.

Without going beyond the scope of the present invention, it is possible to grow two or more plants inside the same greenhouse which need a different best formulation of the nutritive solution by installing two or more sprinkling systems inside the greenhouse (each comprising a tank 5, a pump 6, a feed pipe 7, a runback 8 and a plurality of electrovalves EV) each supplying the trays 4 on which the different plants are grown, with the needed nutritive solution: the peripheral unit 2 controls the frequency and the duration of the plant sprinkling with the nutritive solution by managing the correspondent pump 6 and the correspondent electrovalves EV (for example, as shown in the flowchart of FIG. 2).

Sensors which measure the pH value, the temperature and the conductivity of the nutritive solution and the concentration of the nutritive elements in the nutritive solution are connected to each of the tanks 5: in reply to the data coming from the correspondent sensors, the peripheral logic unit 2 controls the correspondent electrovalves EVS, for example as shown in the simplified flowcharts of FIG. 3–6.

FIG. 2 shows a simplified flowchart showing the cyclic sequence of functional steps performed by the peripheral unit 2 of FIG. 1 to control and adjust at given values the period T and the time of the plant sprinkling t with the nutritive solution which (preferably, but not necessarily) continuously flows from the pump P inside the circuit which comprises the feed pipe 7 and the runback 8.

Such a cyclic sequence comprises at least the step of opening the electrovalves EV (AEV; step 21) to connect the trays 4 to the distribution circuit (6, 7, 8) of the nutritive solution, the step of sprinkling the plant roots with the nutritive solution for a time t (step 22), the step of closing the electrovalves EV (CEV; step 23) and the step of awaiting a given time T (step 24) before repeating the cyclic sequence.

If the nutritive solution does not flow continuously inside the circuit which comprises the feed pipe 7 and the runback 8, the cyclic sequence also comprises the step of starting the pump 6 (AP; step 25) before opening the electrovalves EV (step 21) and the step of stopping the pump 6 (FP; step 26) after closing the electrovalves EV (step 23).

The sprinkling time t can be a given value, but it is preferably directly proportional to the luminosity L measured by the photometer FO of FIG. 1 (typically: $t=t_0+K*$ multiplied by L wherein K is a constant value) : the period T and the sprinkling time t (ie., the parameters $t_o$ and K of the sprinkling time t) can be modified by the central unit 3 for the entire greenhouse 1 or for each tray 4 (or group-of trays 4) to feed plants grown in the greenhouse 1, on each tray (or groups of trays), respectively, in the best manner.

The period T is preferably, but not necessarily, of about 15 minutes and the sprinkling time t is of about 15–20 seconds.

The not limiting flowchart of FIG. 2 comprises the further functional step of verifying the condition of the electrovalves EV and of the pump 6 at the beginning of each cycle (step 27) and the step of controlling that, in reply to the control signals from the peripheral logic unit 2, the electrovalves EV opened (EVA; step 28) and closed (EVC; step 29), respectively and, if it's the case, that the pump 6 started (PA; step 200) and stopped (PF; 201), respectively.

If one or more of the above-mentioned verifications (which can be completely or in part omitted without going beyond the scope of the present invention) reveals a device trouble, the peripheral logic unit 2 emits the correspondent alarm message ALL, after having repeated said verification for a given number of times, if it is the case.

Analogously, also the cyclic sequences shown in the flowcharts of FIGS. 3–6 involve that the peripheral logic unit 2 verifies the condition of the electrovalves EVS at the beginning of each cycle, controls that (in reply to control signals emitted by the peripheral logic unit 2) the electrovalves EVS opened and closed, respectively and emits, if necessary, the correspondent alarm messages ALL; to simplify description and drawings, the corresponding functional steps have been omitted in FIGS. 3–6.

FIG. 3 shows a simplified flowchart which illustrates the cyclic sequence of functional steps performed by the peripheral logic unit 2 of FIG. 1 to control and to adjust at a given value the pH value of the nutritive solution.

Acquired (Ma, step 31) the pH value (a) measured by the correspondent sensor associated with the tank 5, the peripheral logic unit 2 verifies (step 32) if the measured value (a) belongs to the range of acceptable values, defined by a maximum value $a_M$ and by a minimum value $a_m$: if the measured value (a) doesn't belong to such range an alarm message ALL is generated, otherwise the peripheral logic unit 2 verifies (step 33) if the measured value (a) belongs to the range of best values, which is internal to the range of acceptable values and is defined by a best maximum value $a_1$ and by a best minimum value $a_2$: if the measured value (a) belongs to such best range, the peripheral logic unit 2 waits a given time T (step 34) before repeating the cyclic sequence.

If the measured value (a) doesn't belong to the range of the best values, the peripheral logic unit 2 verifies (step 35) that the measured value (a) is greater than the best maximum value $a_1$ and puts a given amount of an acid into the nutritive solution by opening (AEVSa, step 36) an electrovalve EVS (FIG. 1) associated with a tank S containing the acid and by closing the electrovalve EVS (CEVSa, step 38) after a given opening time (ta) (step 37) and waits said given time T (step 34) before repeating the cyclic sequence.

If the measured value (a), belonging to the range of acceptable values, doesn't belong to the range of the best values and is not greater than the best maximum value $a_1$, the measured value (a) is lower than the best minimum value $a_2$: therefore, the peripheral logic unit 2 puts a given amount of a "base" into the nutritive solution by opening (AEVSb, step 360) an electrovalve EVS (FIG. 1) associated with a tank S containing said "base" and by closing the electrovalve EVS (AEVSb, step 380) after said given opening time (ta) (step 370) and waits said given time T (step 34) before repeating the cyclic sequence.

If the peripheral logic unit 2 controls and adjusts at the given values the concentration of the nutritive elements in the nutritive solution by performing the sequence of functional steps shown in FIG. 6, the (nitric, sulphuric or phosphoric) acid put into the nutritive solution by opening (step 36) an electrovalve EVS for the time ta, is determined within such sequence of functional steps on the basis of the nutritive element which has been much more absorbed by plants as percentage value of itself.

For example, if (being 100 the given concentration values of nitrogen, sulphur and phosphorus) the concentration values measured by the peripheral logic unit (FIG. 6, step 61) are 70 for nitrogen, 30 for sulphur and 60 for phosphorus, sulphuric acid is put into the nutritive solution to adjust the pH value of the nutritive solution, to a given value as sulphur is the nutritive element which is much more absorbed by plants.

The waiting time T (long enough to let the acid or the "base" spread uniformly in all the nutritive solution contained inside the tank 5 and flowing in pipes 7 and 8 and, if it's the case, in trays 4), the opening time (ta) of the electrovalves EVS, the maximum value $a_M$, the minimum value $a_m$, the best maximum value $a_1$ and the best minimum value $a_2$ are given and can be modified by the central unit 3; in a preferred embodiment T=15 minutes, ta=10 seconds, $a_M$=6.5, $a_m$=5, $a_1$=5.8 and $a_2$=5.6.

FIG. 4 shows a simplified flowchart showing the cyclic sequence of functional steps performed by the peripheral logic unit 2 of FIG. 1 to control and to adjust at a given value the conductivity of the nutritive solution.

Acquired (Mc, step 41) the value of the conductivity (c) measured by the correspondent sensor associated with the tank 5, the peripheral logic unit 2 verifies (step 42) if the measured value (c) belongs to the range of acceptable values, defined by a maximum value $c_M$ and by a minimum value $c_m$: if the measured value (c) doesn't belong to such range an alarm message ALL is generated, otherwise the peripheral logic unit 2 verifies (step 43) if the measured value (c) belongs to the range of best values, which is internal to the range of acceptable values and is defined by a best maximum value $C_2$ and by a best minimum value $C_2$: if the measured value (c) belongs to such best range, the peripheral unit 2 awaits a given time T (step 44) before repeating the cyclic sequence.

If the measured value (c) doesn't belong to the range of the best values, the peripheral logic unit 2 verifies (step 45) that the measured value (c) is greater than the best maximum value $c_1$ and puts a given amount of water into the nutritive solution by opening (AEVSA, step 46) an electrovalve EVS (FIG. 1) associated with a tank S containing water (or with the water pipe) and by closing the electrovalve EVS (CEVSA, step 48) after a given opening time (ta) (step 47) and waits until said given time T (step 44) before repeating the cyclic sequence.

If the measured value (c) doesn't belong to the range of the best values and is not greater than the best maximum value $c_1$, the measured value (c) is lower than the best minimum value $c_2$: the peripheral logic unit 2 emits (ASF, step 49) an alarm message (alarm for deficient solution) and starts a sequence of functional steps (for example, shown in FIGS. 5 or 6) to control and to adjust at a given value the concentration of the nutritive elements in the nutritive solution. The waiting time T (long enough to let water dilute uniformly all the nutritive solution contained inside the tank 5 and flowing in pipes 7 and 8 (and, if it's the case, in trays 4), the opening time (ta) of the electrovalve EVS, the maximum value $c_M$, the minimum value $c_m$, the best maximum value $c_1$ and the best minimum value $c_2$ are given and can be modified by the central unit 3; generally $c_M$=6000 microSiemens, $c_m$=1000 microSiemens, $C_1$=4000 microSiemens and $c_2$=2000 microSiemens, T is comprised between 5 and 60 minutes and ta is comprised between 5 and 60 seconds.

FIG. 5 shows a simplified flowchart showing the sequence of functional steps performed by the peripheral logic unit 2 of FIG. 1 to control and to adjust at a given value the concentration of the nutritive elements in the nutritive solution.

Long and accurate experimental researches have showed that the nutritive elements (particularly potassium, nitrogen and phosphorus) are absorbed by plants according to precise ratios which depend upon plants and upon vegetative condition of the plant.

Particularly, ratios of nitrogen, phosphorus and potassium absorbed by the plant are comprised between 1:0, 2:2 and 1:2:6.

The sequence of FIG. 5 comprises at least the functional steps of:

acquiring (MK, step 51) the concentration of potassium in the nutritive solution;

calculating (step 52) the amount of potassium to be added to the nutritive solution to adjust the value of the given concentration $K_0$;

calculating (step 53) on the basis of the said ratios between nitrogen and potassium and between phosphorus and potassium, respectively, the amounts of nitrogen and phosphorus to be added to the nutritive solution to adjust at the given values of concentration $N_0$ and $P_0$;

adding the amounts of potassium, nitrogen and phosphorus thus detected to the nutritive solution by acting (AVSK, EVSN, EVSP; step 54) on the electrovalves EVS (FIG. 1) associated with tanks S containing potassium, nitrogen and phosphorus, respectively (in form of salt or of solution of given concentration).

Without going beyond the scope of the present invention, it is possible to adjust at the given values the concentration of the nutritive elements in the nutritive solution by adding said amounts of nutritive elements to the solution, as they are detected.

The concentration of the potassium ion (also called "guide ion") in the nutritive solution is measured in a known manner by means of an ion-specific electrode or other similar mean and the amount of potassium to be added to the nutritive solution to adjust at the given concentration $K_0$ is easily determinable by a specialized chemist.

According to a further sequence of functional steps which the peripheral logic unit 2 of FIG. 1 can perform to control and to adjust at the given values the concentration of the nutritive elements in the nutritive solution, it is possible to measure (in a known manner) the concentration of each nutritive element in the nutritive solution and the thus obtained values (expressed, for example, in parts per million) are "loaded" in the peripheral logic unit 2, for example through the central unit 3: the peripheral logic unit 2 adjusts in an ordered way the concentrations of the nutritive elements at the given values in a given order, by detecting the amounts of salts of the nutritive elements to be added to the nutritive solution.

Take, for example, A, B, C, D, . . . as nutritive elements, whose concentrations in the nutritive solution are meant to be adjusted, in order, at given values. For such purpose:

their concentration in the nutritive solution is measured:

the amount of a salt containing the elements A and B (AB salt) to be added to the nutritive solution to adjust the concentration of the A element at its given value, is calculated;

the amount of the B element put into the nutritive solution by adding said amount of AB salt is calculated and it is summed up to the measured value of the B element;

taking into consideration the measured value of the B element and the amount of such element put into the nutritive solution by adding the AB salt, the amount of a salt containing the B and C elements (BC salt) to be added to the nutritive solution to adjust at its given value the concentration of the B element is calculated;

the amount of the C element put into the nutritive solution by adding said amount of BC salt is calculated and it is summed up to the measured value of the C element;

taking into consideration the measured value of the C element and the amount of such element put into the nutritive solution by adding the BC salt, the amount of a salt containing the C and D elements (CD salt) to be added to the nutritive solution to adjust at its given value the concentration of the C element is calculated; and so on, till the concentrations of all the nutritive elements are adjusted at their given values.

In the simplified flowchart of FIG. 6, the peripheral logic unit 2 calculates in an ordered way the amounts of salts of the nutritive elements (monohydrogen or dihydrogen potassium phosphate or potassium tetrapyrophosphate; potassium nitrate; calcium nitrate or aragonite; and magnesium sulphate) to be added to the nutritive solution and the (nitric, sulphuric or phosphoric) acid to be put into the nutritive solution to control and to adjust at a given value the pH value of the nutritive solution.

The concentrations of the nutritive elements are adjusted at their given values according to the following order: phosphorus, potassium, calcium, nitrogen, magnesium and sulphur.

The sequence of FIG. 6 at least comprises the functional steps of:

acquiring (MEN, step 61) the concentration of the nutritive elements in the nutritive solution;

calculating (step 62) the amount of monohydrogen or dihydrogen potassium phosphate or of potassium tetrapyrophosphate to be added to the nutritive solution to adjust at the given value $P_0$ the concentration of phosphorus;

calculating (step 63) the amount of potassium put into the nutritive solution by adding said amount of monohydrogen or dihydrogen potassium phosphate or of potassium tetrapyrophosphate and summing it up (step 64) to the acquired value of potassium;

calculating (step 65) the amount of potassium nitrate to be added to the nutritive solution to adjust at the given value $K_0$ the concentration of potassium;

calculating (step 66) the amount of nitrogen put into the nutritive solution by adding said amount of potassium nitrate;

calculating (step 67) the amount of calcium nitrate or of aragonite to be added to the nutritive solution to adjust at the given value $Ca_0$ the concentration of calcium;

calculating (step 68) the amount of nitrogen put into the nutritive solution by adding said amount of calcium nitrate or of aragonite;

calculating (step 69) the total concentration of nitrogen in the nutritive solution by summing the amounts of nitrogen put into the nutritive solution by adding said amounts of potassium nitrate and of calcium nitrate or of aragonite up to the measured value of nitrogen;

verified (step 601) that the total concentration of nitrogen in the nutritive solution is lower than the given value $N_0$, adding to the nutritive solution (step 602) nitric acid to adjust at the given value the pH value;

calculating (step 603) the amount of magnesium sulphate to be added to the nutritive solution to adjust at the given value $Mg_0$ the concentration of magnesium;

calculating (step 604) the amount of sulphur put into the nutritive solution by adding said amount of magnesium sulphate and summing it up (step 605) to the measured value of sulphur to calculate the total concentration of sulphur in the nutritive solution;

verified (step 606) that the total concentration of nitrogen in the nutritive solution is not lower than the given value $N_0$ and that the total concentration of sulphur in the nutritive solution is lower than the given value $S_0$, adding sulphuric acid to the nutritive solution (step 607) to adjust at the given value the pH value; otherwise calculating (step 609) the nutritive element (nitrogen, sulphur or phosphorus) which has been much more absorbed by plants in percentage value of itself and adding the acid comprising such nutritive element to the nutritive solution to adjust at the given value the pH value;

adding (step 608) the amounts (FP, NP, NC, SM) of monohydrogen or dihydrogen potassium phosphate or of potassium tetrapyrophosphate; of potassium nitrate; of calcium nitrate or of aragonite and of magnesium sulphate thus calculated to the nutritive solution by opening the electrovalves EVS (FIG. 1) associated with the tanks S which contain (in form of salt or solution of known concentration) monohydrogen or dihydrogen potassium phosphate or potassium tetrapyrophosphate; potassium nitrate; calcium nitrate or aragonite and magnesium sulphate; respectively.

Without going beyond the scope of the present invention, it is possible to adjust at the given values ($P_0$, $K_0$, $Ca_0$, $Mg_0$) the concentration of the nutritive elements in the nutritive solution by adding said amounts (FP, NP, NC, SM) of salts of the nutritive elements to the solution itself, as they are calculated.

A skilled chemist can easily calculate in known manner the amounts of monohydrogen or dihydrogen potassium phosphate or of potassium tetrapyrophosphate (step 62); of potassium nitrate (step 65); of calcium nitrate or of aragonite (step 67) and of magnesium sulphate (step 603) to be added to the nutritive solution to adjust at the given values ($P_0$, $K_0$, $Ca_0$, $Mg_0$) the concentration of phosphorus, potassium, calcium and magnesium; the amount of potassium put (step 63) into the nutritive solution by adding said amount of monohydrogen or dihydrogen potassium phosphate or of potassium tetrapyrophosphate; the amount of nitrogen put (step 66 and 68) into the nutritive solution by adding said amounts of potassium nitrate, of calcium nitrate or of aragonite and the amount of sulphur put (step 604) into the nutritive solution by the addition of said amount of magnesium sulphate.

FIG. 7 shows schematically a modular tray 4, whose tank 71 is movable laterally in relation to the support 72 to increase (at equal covered area) the number of trays 4 disposed inside each greenhouse 1. The trays 4 are connected with the feed pipe 7 and the runback 8 of the nutritive solution (FIG. 1) through the flexible pipes 73 and 74; preferably, but not necessarily, the tray 4 is also connected (through further flexible pipes not shown in FIG. 7) with a further circuit (not shown in FIG. 1) in which a hot fluid flows.

By heating (for example, by gathering part of the residual heat of the waste smoke of means RT of FIG. 1 by means of a heat exchanger) the nutritive solution and/or the hot fluid flowing in the tank 71 of the trays 4, the root system of the plants can be kept at the best temperature and it is therefore possible to keep the room temperature inside the greenhouse 1 at a lower value, with subsequent energy savings.

Support means of the plants grown on the tray are made of covering panels 75, having different width and having holes of different form and dimension (FIG. 8e), which lay on supports 76 mounted on the internal side wall of the tank 71 next to the superior edge of the tank itself.

The panels 75 can be placed on the tray 4 in a horizontal or in an inclined position and sustained by a structure 77 fixed along the longitudinal axis of the tray 4, thus increasing the number of grown plants (or plants which might be grown) for each linear meter of the tray.

If necessary, the supports 78 which sustain nets (not shown in FIG. 7) to which plants during their vegetative cycle are anchored, can be also fixed to the tank 71.

FIG. 8 shows schematically the elements which form the tray of FIG. 7: as it is clearly evident in FIG. 8a), each modular element is closed by one or more covering panels 75 (FIG. 7), one next to the other and sustained by supports 76 and it comprises at least two "L-shaped" lateral parts 81 [FIG. 8b)] which carry the supports 76 and the female element (male) of a male-female coupling, one or more flat parts 82 [FIG. 8c)], whose number changes on the basis of the desired width of the tray, which connect the two lateral parts 81 and which are provided at the opposite sides with the male element (female) or with the female element (male) of a male-female coupling, respectively, and at least a male-male (female-female) junction element 85 [FIG. 8d)] used to connect (if necessary) two parts having the female (male) element.

Parts (81, 82) which form a modular element are connected one another by means of male-female couplings; the modular elements are connected one another and to the closing headers 79 of the tray (FIG. 7) by means of male-female couplings.

As for FIG. 8, it's also possible to see:
some embodiments [FIG. 8e)] of the covering panels 75, which have holes of different form and dimension to sustain different plants;
pipes 86, having nozzles, incorporated into the parts 81 and/or 82 and used to sprinkle the plant roots with the nutritive solution;
pipes 87 (incorporated into the parts 81 and/or 82) wherein the fluid which heats the root system of plants sustained by the panels 75 flows.

Moreover, in FIG. 8, 88 indicates seals [obtained by extrusion (or by other similar way) together with the coupling elements 83 and 84] which, by clasping one another when mounting the tray, guarantee tightness of the tray itself, while seals which, by clasping one another when mounting the tray, guarantee the tightness of the pipes (86 and/or 87) incorporated into the parts 79, 81 and 82 have been omitted to simplify the drawings.

In FIG. 8 each part (81, 82) comprises a pipe 86 and a pipe 87, but, without going beyond the scope of the present invention, each part (81, 82) can contain only one type of pipe (86, 87) and/or two or more pipes of the same type. The modular tray shown in FIGS. 7 and 8, preferably made with plastics and particularly suitable for air culture, can be also advantageously used for soil culture or hydroponics in the greenhouses.

Without going beyond the scope of the present invention, a man can make to the air culture system disclosed herein any change and improvement according to experience and natural evolution of technics.

What is claimed is:

1. An air culture system comprising a management system, said air culture system including a plurality of movable trays, each with a bottom containing a sprinkling means, disposed in one or more greenhouses, characterized in that said management system comprises a central logic unit (3) and one or more peripheral logic units (2) disposed inside said one or more greenhouses (1), each of said one or more greenhouses (1) being managed by said one or more peripheral logic units (2) able to control and adjust at given values a plurality of parameters to keep the best vegetative conditions for the plants grown inside said greenhouse (1).

2. An air culture system according to claim 1, wherein said given values of said plurality of parameters are modifiable through said central logic unit (3).

3. An air culture system according to claim 1, wherein said central logic unit (3) gathers and processes for informative and statistic purposes the values of said parameters detected by said one or more peripheral logic units (2).

4. An air culture system according to claim 1, wherein said one or more peripheral logic units (2) transmit to said central logic unit (3) alarm messages in reply to abnormal conditions detected in said system.

5. An air culture system according to claim 4, wherein said one or more peripheral logic units (2) transmit to said central logic unit (3) said alarm messages in reply to engine troubles and in reply to the fact that said parameters controlled and adjusted by said one or more peripheral logic units (2) go out of a range of given values for a given time.

6. An air culture system according to claim 4, wherein said alarm messages transmitted by said one or more peripheral logic units (2) to said central unit (3) are different according to the risk that each of said abnormal conditions involves for said air culture system.

7. An air culture system according to claim 1, wherein said parameters controlled and adjusted at given values by said one or more peripheral logic units (2) comprise the period (T) and the sprinkling time (t) of said plants with a nutritive solution, the pH value and the conductivity of said nutritive solution and the concentration of nutritive elements in said nutritive solution.

8. An air culture system according to claim 7, wherein said nutritive solution is a water solution containing given amounts of potassium nitrate; of calcium nitrate or of aragonite; of monohydrogen or dihydrogen potassium phosphate or of potassium tetrapyrophosphate; and of magnesium sulfate.

9. An air culture system according to claim 8, wherein said nutritive solution comprises, dissolved in 1000 liters of water, 500–3000 g of potassium nitrate; 700–4000 g of calcium nitrate or of aragonite; 200–1500 g of monohydrogen potassium phosphate or 150–350 g of dihydrogen potassium phosphate or 50–1050 g of tetrapyrophosphate potassium and 300–1800 g of magnesium sulfate.

10. An air culture system according to claim 7, wherein said nutritive solution also comprises very small, given amounts of further chemical elements absorbed by the root system of the plants.

11. An air culture system according to claim 7, wherein said one or more peripheral logic units (2) controls and adjusts at given values said period (T) and said sprinkling time (t) of said plants with said nutritive solution through a cyclic sequence of functional steps comprising:
opening electrovalves (EV) able to connect said trays (4) to a distribution circuit (6, 7, 8) of said nutritive solution;
sprinkling for said time (t) the roots of said plants with said nutritive solution;
closing said electrovalves (EV);
awaiting said period (T) before repeating said cyclic sequence.

12. An air culture system according to claim 11, wherein said cyclic sequence also comprises the steps of starting a pump (6) belonging to said distribution circuit (6, 7, 8) before opening said electrovalves (EV) and of stopping said pump (6) after closing said electrovalves (EV).

13. An air culture system according to claim 11, wherein said sprinkling time (t) is directly proportional to the luminosity (L) inside the greenhouse (1).

14. An air culture system according to claim 11, wherein said period (T) is of about 15 minutes and in that said sprinkling time (t) is between 15 and 20 seconds.

15. An air culture system according to claim 7, wherein said one or more peripheral logic units (2) control and adjust at a given value said pH value of said nutritive solution by performing a cyclic sequence of functional steps comprising at least the steps of:

acquiring a value of said pH;

verifying if said value belongs to a first range of values, defined by a maximum value ($a_M$) and by a minimum value ($a_m$);

if said value doesn't belong to said first range, generating an alarm message (ALL), otherwise verifying if said value belongs to a second range, internal to said first range and defined by a best maximum value ($a_1$) and by a minimum value ($a_2$);

if said second value belongs to said second range, awaiting a given cycle time (T) before repeating said cyclic sequence;

if said second value doesn't belong to said second range, verifying if said value is greater than said best maximum value ($a_1$), putting into said nutritive solution a given amount of an acid by opening an electrovalve (EVS) connected to a tank (S) containing said acid and by closing said electrovalve (EVS) after a given opening time (ta) and awaiting said given cycle time (T) before repeating said cyclic sequence;

if said value is lower than said best minimum value ($a_2$), putting into said nutritive solution a given amount of a base by opening an electrovalve (EVS) connected to a tank (S) containing said base and by closing said electrovalve (EVS) after said given opening time (ta) and awaiting said given cycle time (T) before repeating said cyclic sequence.

16. An air culture system according to claim 15, wherein said given time (T) is of about 15 minutes, said opening time (ta) of said electrovalves (EVS) is of about 15 seconds, maximum value ($a_M$) of said pH is 6.5, said minimum value ($a_m$) of said pH is 5, said best maximum value ($a_1$) of said pH is 5.8 and said best minimum value ($a_2$) of said pH is 5.6.

17. An air culture system according to claim 15, wherein said given time (T) lets said acid, respectively said base, to spread uniformly in said nutritive solution.

18. An air culture system according to claim 7, wherein said one or more peripheral logic units (2) control and adjust at a given value said conductivity of said nutritive solution through a cyclic sequence of functional steps comprising at least the steps of:

acquiring a value of said conductivity;

verifying if said value belongs to a first range of values, defined by a maximum value ($c_M$) and by a minimum value ($c_m$);

if said value doesn't belong to said first range, generating an alarm message (ALL), otherwise verifying if said value belongs to second range, internal to said first range and defined by a best maximum value ($c_1$) and by a best minimum value ($c_2$);

if said second value belongs to said second range, awaiting a given cycle time (T) before repeating said cyclic sequence;

if said second value doesn't belong to said second range, verifying if said value is greater than said best maximum value ($c_1$), putting into said nutritive solution a given amount of water by opening an electrovalve (EVS) and by closing said electrovalve (EVS) after a given opening time (ta) and awaiting said given cycle time (T) before repeating said cyclic sequence;

if said value is lower than said best minimum value ($c_2$), generating an alarm message and adjusting at given values said concentrations of said nutritive elements in said nutritive solution.

19. An air culture system according to claim 18, wherein said given time (T) is between 5 and 60 minutes, said opening time (ta) of said electrovalves (EV) is between 5 and 60 seconds, said maximum value ($c_M$) of said conductivity is 6000 microSiemens, said minimum value ($c_m$) of said conductivity is 1000 microSiemens, said best maximum value ($c_1$) of said conductivity is 4000 microSiemens and said best minimum value ($c_2$) of said conductivity is 2000 microSiemens.

20. An air culture system according to claim 18, wherein said given time (T) lets said water to uniformly dilute said nutritive solution.

21. An air culture system according to claim 7, wherein said one or more peripheral logic units (2) control and adjust at given values said concentration of said nutritive elements in said nutritive solution through a sequence of functional steps comprising:

acquiring the concentration of potassium in said nutritive solution;

calculating the amount of potassium to be added to said nutritive solution to adjust the potassium concentration of said given value of potassium concentration;

calculating the amounts of nitrogen and phosphorus, related by given proportionality ratios to said amount of potassium, to be added to said nutritive solution to adjust the concentration of nitrogen and phosphorus at said given values of concentration of nitrogen and phosphorus.

22. An air culture system according to claim 21, wherein said sequence of functional steps comprises the further step of adding said amounts of potassium, nitrogen and phosphorus to said nutritive solution by acting on the electrovalves (EVS) associated with tanks (S) containing potassium, nitrogen and phosphorus, respectively.

23. An air culture system according to claim 21, wherein said given proportionality ratios of nitrogen, phosphorus and potassium are comprised between 1:0.2:2 and 1:2:6.

24. An air culture system according to claim 7, wherein said one or more peripheral logic units (2) control and adjust at given values said concentration of said nutritive elements in said nutritive solution by adding salts of said nutritive elements to said nutritive solution.

25. An air culture system according to claim 24, wherein the concentrations of said nutritive elements are adjusted at said given values in a given order.

26. An air culture system according to claim 24, wherein said one or more peripheral logic unit (2) also determines the acid selected from the group consisting of nitric, sulfuric and phosphoric acid to be put into said nutritive solution to control and adjust at a given value said pH value of said nutritive solution.

27. An air culture system according to claim 24, wherein said one or more peripheral logic units (2) control and adjust at given values said concentrations of said nutritive elements in said nutritive solution, wherein said nutritive solution contains at least a first nutritive element, a second nutritive element, a third nutritive element and a fourth nutritive element, through a sequence of functional steps comprising at least the steps of:

acquiring said concentrations of said nutritive elements in said nutritive solution;

calculating the amount of a first salt containing said first and second nutritive elements to be added to said nutritive solution to adjust at said given value said concentration of said first nutritive element;

calculating the amount of said second nutritive element put into said nutritive solution by adding said amount of said first salt and summing it up to said concentration of said second nutritive element;

taking into consideration said concentration of said second nutritive element and said amount of said second nutritive element put into said nutritive solution by adding said amount of said first salt, calculating the amount of a second salt containing said second and third nutritive elements to be added to said nutritive solution to adjust at said given value said concentration of said second nutritive element;

calculating the amount of said third nutritive element put into nutritive solution by adding said amount of said second salt and summing it up to said concentration of said third nutritive element;

taking into consideration said concentrations of said third nutritive element and said amount of said third nutritive element put into said nutritive solution by adding said amount of said second salt, calculating the amount of a third salt containing said third and fourth nutritive elements to be added to said nutritive solution to adjust to said given value concentration of said third nutritive element;

repeating in sequence the above-mentioned functional steps until the concentrations of all said nutritive elements are adjusted at said given values.

28. An air culture system according to claim 25, wherein said salts added to said salts added to said nutritive solution are:

(a) monohydrogen potassium phosphate, dihydrogen potassium phosphate or potassium pyrophosphate;

(b) potassium nitrate, calcium nitrate or aragonite and (c) magnesium sulfate;

and by the fact that said nutritive elements whose concentrations are adjusted at said given values in the following order: phosphorus, calcium, potassium, nitrogen, magnesium and sulfur.

29. An air culture system according to claim 28, wherein said one or more peripheral logic units (2) control and adjust at given values said concentrations of said nutritive elements in said nutritive solution through a sequence of functional steps comprising:

acquiring said concentrations of said nutritive elements in said nutritive solution;

calculating the amount of said monohydrogen or of said dihydrogen potassium phosphate or of said potassium nitrate to be added to said nutritive solution to adjust at said given value ($P_O$) said concentration of said phosphorus;

calculating the amount of said potassium put into said nutritive solution by adding said amount of monohydrogen or of dihydrogen potassium phosphate or of potassium tetrapyrophosphate and summing it up to said concentration of said potassium;

calculating the amount of said potassium nitrate to be added to said nutritive solution to adjust at said given value ($K_O$) said concentration of said potassium;

calculating the amount of said nitrogen put into said nutritive solution by adding said amount of potassium nitrate;

calculating the amount of said calcium nitrate or of said aragonite to be added to said nutritive solution to adjust at said given value ($Ca_O$) said concentration of said calcium;

calculating the amount of said nitrogen put into said nutritive solution by adding said amount of calcium nitrate or of aragonite;

calculating the total concentration of said nitrogen by summing said amounts of said nitrogen put into said nutritive solution by adding said amounts of potassium nitrate and of calcium nitrate or of aragonite up to said concentration of said nitrogen;

verifying that said total concentration of said nitrogen in said nutritive solution is lower than said given value ($N_O$), adding to said nutritive solution nitric acid to adjust at said given value pH value;

calculating the amount of said magnesium sulfate to be added to said nutritive solution to adjust at said given value ($Mg_O$) said concentration of said magnesium;

calculating the amount of said sulfur put into said nutritive solution by adding said amount of magnesium sulfate and summing it up to said concentration of said concentration of said sulfur;

verifying that said total concentration of said nitrogen in said nutritive solution is not lower than said given value ($N_O$) and that said total concentration of said sulfur in said nutritive solution is lower than said given value ($S_O$), adding sulfuric acid to said nutritive solution to adjust at said given value said pH value; otherwise calculating the nutritive element selected from the group consisting of nitrogen, sulfur and phosphorus which has been much more absorbed by plants in percentage value of itself and adding the acid comprising said nutritive element to said nutritive solution to adjust at said given value said pH value.

30. An air culture system according to claim 29, characterized by comprising the further step of adding said amounts of monohydrogen or dihydrogen potassium phosphate or of potassium tetrapyrophosphate, potassium nitrate, calcium nitrate or aragonite and magnesium sulfate to said nutritive solution by opening electrovalves (EVS) associated with tanks (S) containing said monohydrogen or said dihydrogen potassium phosphate or said potassium tetrapyrophosphate, said potassium nitrate, said calcium nitrate or said aragonite and said magnesium sulfate, respectively.

31. An air culture system according to claim 1, where each tray (4) comprises a tank laterally movable in relation to a corresponding support and is characterized by being modular, by being connected to a feed pipe (7) and to a runback (8) of a nutritive solution through flexible pipes (73, 74) and by the fact that said plants grown on said tray (4) are sustained by covering panels (75) which lay on supports (76) located on the internal side wall of said tank (71) next to the superior edge of said tank.

32. An air culture system according to claim 31, characterized by being connected to a further circuit wherein a hot fluid flows through further flexible pipes.

33. An air culture system according to claim 31, wherein said covering panels (75) have different width and have holes of different form and dimensions.

34. An air culture system according to claim 31, wherein said covering panels (75) are placed on said tray (4) in an inclined position and are sustained by a structure (77) positioned between said covering panels (75) and said supports (76).

35. An air culture system according to claim 31, wherein each modular element of said tray comprises at least two L-shaped lateral parts (81), carrying said supports (76) for said covering panels (75) and first male-female coupling means (83), at least a flat part (82) able to connect said lateral parts (81) and provided at the opposite sides with said first coupling means (83), respectively with second male-female coupling means (84), which are complementary to said first coupling means (83); and at least a junction element (85) provided at both sides with said first (83) or with said second (84) male-female coupling means, said parts (81, 82) forming each of said modular elements being connected one another by means of male-female couplings.

36. An air culture system according to claim 35, wherein said modular elements are connected to one another and to the headers (79) of said tray (4) by means of male-female couplings.

37. An air culture system according to claim 35, wherein said first (83) and second (84) male-female coupling means have seals (88) realized at the same time of said first (83) and second (84) male-female coupling means.

38. An air culture system according to claim 35, wherein said lateral parts (81) and said at least one flat part (82) include at least one pipe (86), having nozzles and able to sprinkle the roots of said plants with said nutritive solution, and/or at least one second pipe (87) wherein a hot fluid flows.

39. An air culture system according to claim 35, wherein said headers (79) of the tray (4), said laterals parts (81), said at least one flat part (82) and said at least one junction element (85) are made of plastics and realized by extrusion.

* * * * *